United States Patent
Qin

(10) Patent No.: US 10,685,417 B2
(45) Date of Patent: Jun. 16, 2020

(54) METHOD AND DEVICE FOR SEARCHING IN A TOUCH-SCREEN APPARATUS BASED ON GESTURE INPUTS

(71) Applicant: Baidu Online Network Technology (Beijing) Co., Ltd., Beijing (CN)

(72) Inventor: Jian Qin, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 901 days.

(21) Appl. No.: 14/979,244

(22) Filed: Dec. 22, 2015

(65) Prior Publication Data

US 2016/0132983 A1 May 12, 2016

Related U.S. Application Data

(63) Continuation of application No. PCT/CN2014/083413, filed on Jul. 31, 2014.

(30) Foreign Application Priority Data

Aug. 29, 2013 (CN) .......................... 2013 1 0385219

(51) Int. Cl.
*G06T 1/00* (2006.01)
*G06F 16/583* (2019.01)
(Continued)

(52) U.S. Cl.
CPC .......... *G06T 1/0007* (2013.01); *G06F 3/0482* (2013.01); *G06F 3/0486* (2013.01);
(Continued)

(58) Field of Classification Search
CPC ............... G06F 3/04817; G06F 3/0481; G06F 3/04847; G06F 3/04833; G06F 3/0488;
(Continued)

(56) References Cited

U.S. PATENT DOCUMENTS 5,155,806 A * 10/1992 Hoeber .................. G06F 9/453
715/711
5,157,768 A * 10/1992 Hoeber .................. G06F 9/453
715/711

(Continued)

FOREIGN PATENT DOCUMENTS

CN       101216841 A       7/2008
CN       101620680 A       1/2010

(Continued)

OTHER PUBLICATIONS

First Office Action, dated Jan. 22, 2016, for Chinese Application No. 201310385219.3, 5 pages (with English Translation).

(Continued)

*Primary Examiner* — Jennifer N To
*Assistant Examiner* — Joseph R. Burwell
(74) *Attorney, Agent, or Firm* — Seed IP Law Group LLP

(57) ABSTRACT

A method and device for searching in a touch-screen apparatus are provided. The method comprises steps of: displaying a floating control for selecting the content to be searched for on the user interface of the touch-screen apparatus, wherein the inner region of the floating control has a transparent background; receiving a gesture input on the screen of the touch-screen apparatus by a user for the floating control, and adjusting the position and shape of the floating control according to the received gesture until the floating control encircles the content to be searched for in the user interface; capturing the image encircled by the floating control in the user interface; recognizing the content to be searched for encircled in the captured image; calling a defined search interface for searching according to the type of recognized content to be searched for.

17 Claims, 2 Drawing Sheets

(51) Int. Cl.
*G06F 3/0488* (2013.01)
*G06F 3/0482* (2013.01)
*G06F 16/9032* (2019.01)
*G06F 16/532* (2019.01)
*G06F 3/0486* (2013.01)

(52) U.S. Cl.
CPC ........ *G06F 3/0488* (2013.01); *G06F 3/04883* (2013.01); *G06F 16/532* (2019.01); *G06F 16/583* (2019.01); *G06F 16/9032* (2019.01); *G06T 2200/24* (2013.01)

(58) Field of Classification Search
CPC ............ G06F 2203/04801; G06F 2203/04804; G06K 9/00362; G06K 9/228; G06K 19/06028
See application file for complete search history.

(56) References Cited

U.S. PATENT DOCUMENTS

| | | | | |
|---|---|---|---|---|
| 5,375,199 | A * | 12/1994 | Harrow | G06F 3/033 709/223 |
| 5,640,002 | A * | 6/1997 | Ruppert | G06K 7/0008 235/462.46 |
| 7,100,123 | B1 * | 8/2006 | Todd | G06F 16/30 715/862 |
| 8,308,069 | B2 * | 11/2012 | Barber | G06K 17/0022 235/462.11 |
| 8,868,598 | B2 * | 10/2014 | Zhang | G06F 16/9577 707/769 |
| 8,878,785 | B1 * | 11/2014 | Nordstrom | G06F 3/04883 345/157 |
| 2003/0128212 | A1 * | 7/2003 | Pitkow | G06T 11/206 345/440 |
| 2005/0022130 | A1 * | 1/2005 | Fabritius | G06F 3/038 715/739 |
| 2006/0250378 | A1 * | 11/2006 | Fabre | G06F 3/0481 345/173 |
| 2009/0058820 | A1 | 3/2009 | Hinckley | |
| 2009/0327272 | A1 * | 12/2009 | Koivunen | G06F 16/48 |
| 2010/0045570 | A1 * | 2/2010 | Takata | G06F 3/0481 345/4 |
| 2010/0275122 | A1 * | 10/2010 | Buxton | G06F 1/1626 715/728 |
| 2011/0125735 | A1 * | 5/2011 | Petrou | G06F 16/5838 707/723 |
| 2012/0197857 | A1 | 8/2012 | Huang et al. | |
| 2013/0061166 | A1 * | 3/2013 | Seo | G06F 3/0484 715/780 |
| 2013/0132361 | A1 | 5/2013 | Chen et al. | |
| 2013/0181050 | A1 * | 7/2013 | McConnell | G06K 7/0004 235/440 |
| 2013/0188886 | A1 * | 7/2013 | Petrou | G06F 3/048 382/305 |
| 2014/0223381 | A1 * | 8/2014 | Huang | G06F 3/04883 715/863 |
| 2015/0143285 | A1 * | 5/2015 | Wei | G06F 3/0481 715/799 |
| 2016/0335787 | A1 * | 11/2016 | Martin | G06F 11/32 |

FOREIGN PATENT DOCUMENTS

| | | |
|---|---|---|
| CN | 102214060 A | 10/2011 |
| CN | 102693061 A | 9/2012 |
| CN | 103037102 A | 4/2013 |
| CN | 103135884 A | 6/2013 |
| CN | 103455590 A | 12/2013 |

OTHER PUBLICATIONS

Second Office Action, dated Sep. 9, 2016, for Chinese Application No. 201310385219.3, 5 pages (with English Translation).
Third Office Action, dated Dec. 26, 2016, for Chinese Application No. 201310385219.3, 5 pages (with English Translation).
Chinese Search Report, dated Jan. 14, 2016, for Chinese Application No. 201310385219.3, 1 page.
Notification to Grant Patent Right for Invention, dated Apr. 7, 2017, for Chinese Application No. 201310385219.3, 3 pages (with English Translation).

* cited by examiner

METHOD AND DEVICE FOR SEARCHING IN A TOUCH-SCREEN APPARATUS BASED ON GESTURE INPUTS

This application claims the priority of the Chinese application with the filing date of Aug. 29, 2013, the Application No. of 201310385219.3, and the title of "Method and device for searching in a touch-screen device".

TECHNICAL FIELD

The present application relates to a method and device for searching in a touch-screen apparatus, especially to technology of searching through directly obtaining the information to be searched for of the touch-screen apparatus in the current operation page.

BACKGROUND

With the promotion and popularization of smart devices (such as: touch-screen phone and tablet) and mobile Internet, people can obtain desired relevant information through accessing the Internet with these smart devices anywhere. But, when viewing the relevant information, especially when reading electronic files, people often encounter some unfamiliar words that can only be precisely understood through relevant online searching. The usual solution is to switch from the current reading page to a browser interface, and then to enter into search pages through inputting URLs of various search engines into the URL address bar of the browser window or through the help of favorite URLs, to type the aforementioned unfamiliar words in the text edit box of the search engines, and finally to start the search button so as to view the search result returned by the search engine in the browser. Accordingly, the conventional search process not only is cumbersome, but also has to input a lot of URLs and texts in duplication, which, in the case of high searching frequencies, seriously affects user experience.

SUMMARY

An embodiment provides a method and device for searching in a touch-screen apparatus. In an embodiment, relevant information may be searched in the current page without switching the current page in operation, and a variety of types of searching are supported according to the user's needs.

In an embodiment, a method for searching in a touch-screen apparatus is provided, comprising steps of: displaying a floating control for selecting the content to be searched for on the user interface of the touch-screen apparatus, wherein the inner region of the floating control has a transparent background; receiving a gesture input on the screen of the touch-screen apparatus by a user for the floating control, and adjusting the position and shape of the floating control according to the received gesture until the floating control encircles the content to be searched for in the user interface; capturing the image encircled by the floating control in the user interface; recognizing the content to be searched for encircled in the captured image; calling a defined search interface for searching according to the type of recognized content to be searched for.

In an embodiment, the floating control is a rectangular box.

In an embodiment, the step of adjusting the position and shape of the floating control according to the received gesture until the floating control encircles the content to be searched for in the user interface comprises: determining the type of the received gesture; if the received gesture is touching and dragging of the rectangular box by the user with a finger, moving the position of the rectangular box according to the trajectory of the sliding of the finger; if the received gesture is touching and relative sliding of two fingers of the user from the inside toward the outside of the rectangular box along a direction across two opposite sides of the rectangular box or along a diagonal direction of the rectangular box, enlarging the rectangular box along the direction across two opposite sides of the rectangular box or along the diagonal direction of the rectangular box; if the received gesture is touching and relative sliding of two fingers of the user from the outside toward the inside of the rectangular box along a direction across two opposite sides of the rectangular box or along a diagonal direction of the rectangular box, diminishing shape of the rectangular box along the direction across two opposite sides of the rectangular box or along the diagonal direction of the rectangular box; if the received gesture is releasing and leaving of the user's fingers from the rectangular box, ending the adjusting of the position and shape of the rectangular box.

In an embodiment, the step of recognizing the content to be searched for encircled in the captured image comprises: sending the captured image to a server for recognition; receiving the recognition result corresponding to the captured image from the server as the content to be searched for.

In an embodiment, the types of the content to be searched for include Chinese and English.

In an embodiment, the step of calling a defined search interface for searching according to the type of recognized content to be searched for comprises: determining the type of recognized the content to be searched for according to the recognized content to be searched for; if the type of recognized the content to be searched for is Chinese, calling an encyclopedia search interface to perform search on the content to be searched for; if the type of recognized the content to be searched for is not Chinese, calling a translation search interface to translate the content to be searched for.

In an embodiment, the step of calling a defined search interface for searching according to the type of recognized content to be searched for comprises: providing a plurality of processing options on the screen of the touch-screen apparatus, the various processing options corresponding to defined search interfaces; receiving the processing option selected by the user according to the type of the recognized content to be searched for and calling a defined search interface according to the processing option selected by the user.

In an embodiment, the method comprises: calling a defined application interface for exhibiting based on the type of the available search result.

In an embodiment, the types of the search result include text, picture, map, video, and music.

In an embodiment, the step of calling a defined application interface for exhibiting based on the type of the available search result comprises: determining the type of the search result based on the search result; if the type of the search result is video or music, calling a defined player program to play the search result; otherwise, creating a floating window in the screen of the touch-screen apparatus, and exhibiting the search result in the floating window.

In an embodiment, a device for searching in a touch-screen apparatus is provided, comprising: a display unit, used to display a floating control for selecting the content to be searched for in the user interface of the touch-screen apparatus, wherein the inner region of the floating control has a transparent background; an adjustment unit, used to receive a gesture input on the screen of the touch-screen apparatus by a user for the floating control, and to adjust the position and shape of the floating control according to the received gesture until the floating control encircles the content to be searched for in the user interface; a capturing unit, used to capture the image encircled by the floating control in the user interface; a recognition unit, used to recognize the content to be searched for encircled in the captured image; and a search unit, used to call a defined search interface for searching according to the type of recognized content to be searched for.

In an embodiment, the floating control is a rectangular box.

In an embodiment, the processing of the device to adjust the position and shape of the floating control according to the received gesture until the floating control encircles the content to be searched for in the user interface comprises: determining the type of the received gesture; if the received gesture is touching and dragging of the rectangular box by the user with a finger, moving the position of the rectangular box according to the trajectory of the sliding of the finger; if the received gesture is touching and relative sliding of two fingers of the user from the inside toward the outside of the rectangular box along a direction across two opposite sides of the rectangular box or along a diagonal direction of the rectangular box, enlarging the shape of the rectangular box along the direction across two opposite sides of the rectangular box or along the diagonal direction of the rectangular box; if the received gesture is touching and relative sliding of two fingers of the user from the outside toward the inside of the rectangular box along a direction across two opposite sides of the rectangular box or along a diagonal direction of the rectangular box, diminishing the shape of the rectangular box along the direction across two opposite sides of the rectangular box or along the diagonal direction of the rectangular box; if the received gesture is releasing and leaving of the user's fingers from the rectangular box, ending the adjusting of the position and shape of the rectangular box.

In an embodiment, the recognition unit sends the captured image to a server for recognition, and receives the recognition result corresponding to the captured image from the server as the content to be searched for.

In an embodiment, the types of the recognized content to be searched for include Chinese and English.

In an embodiment, the search unit determines the type of the recognized content to be searched for according to the recognized content to be searched for; if the type of the recognized content to be searched for is Chinese, the search unit calls an encyclopedia search interface to perform search on the content to be searched for; if the type of the recognized content to be searched for is not Chinese, the search unit calls a translation search interface to translate the content to be searched for.

In an embodiment, the search unit provides a plurality of processing options on the screen of the touch-screen apparatus, the various processing options corresponding to defined search interfaces; the search unit receives the processing option selected by the user according to the type of the recognized content to be searched for and calls a defined search interface according to the processing option selected by the user.

In an embodiment, the device comprises: an exhibiting unit, for calling a defined application interface for exhibiting based on the type of the available search result.

In an embodiment, the types of the search result include text, picture, map, video, and music.

In an embodiment, the exhibiting unit determines the type of the search result based on the search result; if the type of the search result is video or music, the exhibiting unit calls a defined player program to play the search result; otherwise, the exhibiting unit creates a floating window in the screen of the touch-screen apparatus, to exhibit the search result in the floating window.

Beneficial Effect

Compared with the prior art, various embodiments may facilitate providing one or more of the following advantages: searching relevant information in the current page without switching the current page in operation, while facilitating use of a variety of types of searching according to the user's needs. An embodiment may perform searches directly on information of the current page, facilitating avoiding the tedious routine search process, which may improve the efficiency of searches to a large extent and enhance the user experience.

BRIEF DESCRIPTION OF THE DRAWINGS

Example embodiments are discussed in the following description accompanied with the drawings, including.

DETAILED DESCRIPTION

Hereinafter, example embodiments will be described in detail.

In an embodiment, a method comprises displaying, on the user interface currently operated in a touch-screen apparatus, a floating control for selecting the content to be searched for, adjusting the position and shape of the floating control displayed on the user interface through user gestures until the floating control circles the content to be searched for, in this way, the approach for searching the content to be searched for is not only able to perform searches on relevant information in the current page without switching the current operation page, but also able to provide a variety of types of searching according to the user's needs.

Figure 1:
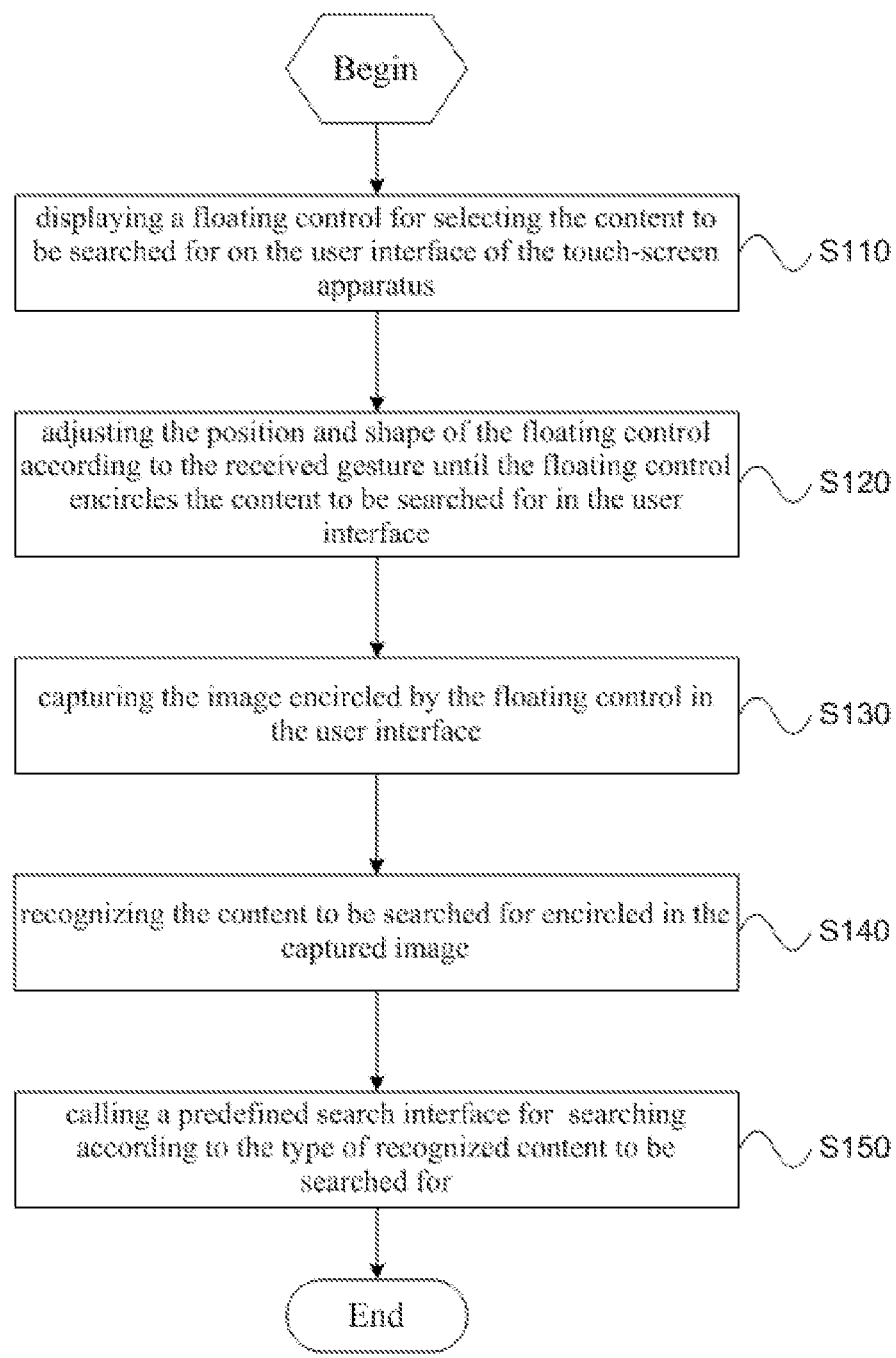
FIG. 1 is a flowchart illustrating searches performed in a touch-screen apparatus according to an embodiment.
Figure 2:
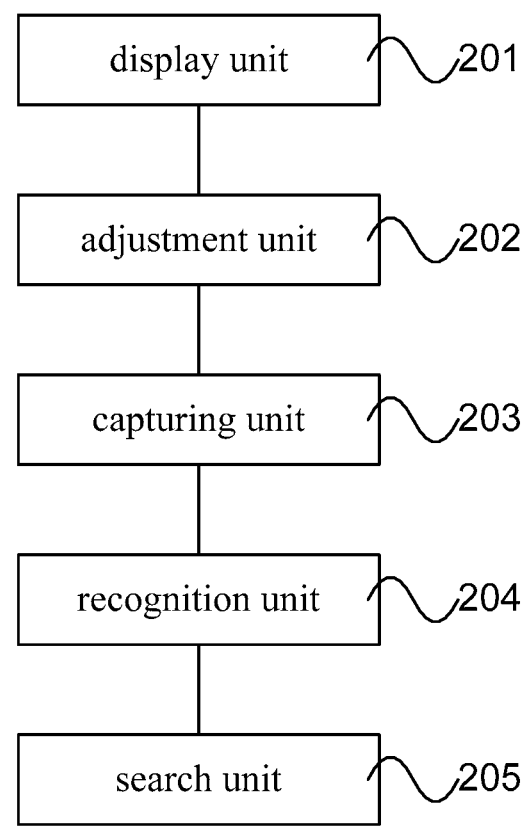
FIG. 2 is a block diagram illustrating the device for searching in a touch-screen apparatus according to an embodiment.

FIG. 1 shows the flow chart of an embodiment of the method of perform searches in a touch-screen apparatus. FIG. 2 shows a device for searching in a touch-screen apparatus that can be used to implement the method described in FIG. 1.

As shown in FIG. 1, in step S110, a floating control for selecting the content to be searched for is displayed on the user interface of the touch-screen apparatus. The inner region of the floating control may have a transparent background, which may be partially transparent.

As should be noted, the floating control according to an embodiment may be used to circle a part of the information displayed in the current displaying screen by the touch-screen apparatus, the part of the information may be reading pages (such as documents of doc, pdf, html, and etc.), and may also be information displayed in other applications or operation pages, it is not particularly limited, any content the user intends to know and query can be the information in the floating control, e.g., any information the user intends to query and search.

In specific embodiments, the floating control may take various shapes, such as rectangular, oval, or other closed shapes, which circle the information the user intends to query. In consideration that the rectangular shape may be easier for the user to operate than other closed shapes, the floating control according to one embodiment is a rectangular box to suit users' habit better.

In step S120, the device receives a gesture input on the screen of the touch-screen apparatus by a user for the floating control, and adjusts the position and shape of the floating control according to the received gesture until the floating control encircles the content to be searched for in the user interface.

In an embodiment where the floating control is a rectangular box, the device may adjust the position and shape of the floating control according to the received gesture until the floating control encircles the content to be searched for in the user interface, comprising the following steps: the device determines the type of the received gesture; if the received gesture is touching and dragging of the rectangular box by the user with a finger, the position of the rectangular box is moved according to the trajectory of the sliding of the finger; if the received gesture is touching and relative sliding of two fingers of the user from the inside toward the outside of the rectangular box along a direction across two opposite sides of the rectangular box or along a diagonal direction, the rectangular box is enlarged along the direction across two opposite sides of the rectangular box or along the diagonal direction of the rectangular box; if the received gesture is touching and relative sliding of two fingers of the user from the outside toward the inside of the rectangular box along a direction across two opposite sides of the rectangular box or along a diagonal direction, the rectangular box is diminished along the direction across two opposite sides of the rectangular box or along the diagonal direction of the rectangular box; if the received gesture is releasing and leaving of the user's fingers from the rectangular box, the adjusting of the position and shape of the rectangular box is ended.

In step S130, the device captures the image encircled by the floating control in the user interface.

In this step S130, the captured image may be a partial screenshot in the touch-screen apparatus by the current user, e.g., the image displayed within the floating control.

In step S140, the device recognizes the content to be searched for encircled in the captured image.

In the consideration of limited memory and resources of the touch-screen apparatus, to reduce consumption of the memory and resources of the touch-screen apparatus as much as possible, step S140 according to an embodiment may comprise: the device sends the captured image to a server for recognition; the recognition result corresponding to the captured image is received from the server as the content to be searched for.

In step S150, the device calls a defined search interface, which may be predefined, for searching according to the type of recognized content to be searched for.

In the consideration of the fact that users' search objects may mainly include some unfamiliar Chinese phrases and English words, the content to be searched for can be categorized into two cases, e.g., Chinese and English, for the convenience of processing, and therefore, according to one embodiment, the types of the content to be searched for include Chinese and English.

In an embodiment where the types of the recognized content to be searched for include Chinese and English, the steps of step S150 may comprise: the device determines the type of the content to be searched for according to the recognized content to be searched for; if the type of the recognized content to be searched for is Chinese, the device calls an encyclopedia search interface to perform search on the content to be searched for; if the type of the recognized content to be searched for is not Chinese, the device calls a translation search interface to translate the content to be searched for.

In an embodiment, the user can also select an appropriate search interface according to the type of the recognized content to be searched for, so as to perform searches on the content to be searched for. Specifically, according to an embodiment, the steps of Step S150 may comprise: the device provides a plurality of processing options on the screen of the touch-screen apparatus, the various processing options corresponding to defined search interfaces; the device receives the processing option selected by the user according to the type of the recognized content to be searched for and calls a defined search interface according to the processing option selected by the user. In an embodiment, the device may pop up a menu on the screen of the touch-screen apparatus, respective menu items in the menu corresponding to various query types that can be selected, for example, image recognition, music search, translation, maps, and etc. The user may select an appropriate menu item according to his needs, so as to call a search interface corresponding to the selected menu item to perform search. The following are examples of a plurality of types of search interfaces that may be provided by a search engine:

1. Translation Interface

When a user encounters unfamiliar English words, the device can obtain corresponding translation for the English words through the search interface.

2. Music/Video Interface

When a user sees the title of an interesting song and/or other video work, the device can obtain the song/movie corresponding to the title of the song/movie through the search interface.

3. Map Interface

When a user sees a place name on the touch-screen apparatus, the device can obtain the route to the place through the search interface.

4. Image Recognition Interface

When a user sees a picture of a star and intends to see more relevant pictures, the device can obtain more relevant pictures through the search interface.

5. Encyclopedia Interface

When a user intends to know relevant information about a keyword, the device can select the search interface to obtain specific information about the keywords.

Because in a usual situation, the search result the search interface returned from the search engine is displayed through a browser, which will block the displayed content the user is viewing when the browser is displayed in the full screen, to show the relevant search result without affecting the user's view of the current content, in an embodiment the device may call a defined application interface for exhibiting based on the type of the available search result.

For example, according to an embodiment, the types of the search result include text, picture, map, video, and music.

Accordingly, the steps for the device to call a defined application interface for exhibiting based on the type of the available search result may comprise: the device determines the type of the search result based on the search result; if the type of the search result is video or music, the device calls a defined player program to play the search result; otherwise, the device creates a floating window in the screen of the touch-screen apparatus, and exhibit the search result in the floating window. In addition, to avoid affecting the user's continuing to view the current user interface, the device may also control the displaying time of the floating window, the floating window can be closed or disappear by itself after being displayed for a period of time, or the device may allow the user to manually close the floating window.

In an embodiment, the above search results of different types may also have different displaying forms. For example, for the aforementioned various types of search interface:

1. Translation Interface

The device can display the result returned from the search interface directly in a floating window, the user can continue to read the displayed content he was reading after closing the floating window.

2. Music/Video Interface

The device can directly call a music/video player program to directly download and play the results returned from the interface.

3. Map Interface

The device may display the map for the queried location and nearby places in the floating window as a small image, the small image can be enlarged after the user clicks on the small image.

4. Image Recognition Interface

The device may display the result returned from the search interface floating window as a small image, the small image can be enlarged after the user clicks on the small image.

5. Encyclopedia Interface

The device extracts an abstract from the result returned from the search interface and displays the abstract in the floating window.

In addition to the above approaches using a floating window to display the result, other approaches may used for the displaying, for example for a touch-screen mobile phone. As a cell phone's screen is relatively small, one can consider displaying the search result alone in the entire screen of the apparatus, in this way the user can return to the original user interface through the return key.

FIG. 2 illustrates a block diagram of a device for searching in a touch-screen apparatus according to an embodiment.

As shown in FIG. 2, the device at least comprises a display unit 201, an adjustment unit 202, a capturing unit 203, a recognition unit 204, and a search unit 205.

The display unit 201 is used to display a floating control for selecting the content to be searched for in the user interface of the touch-screen apparatus. The inner region of the floating control may have a transparent background, which may be partially transparent.

The adjustment unit 202 is used to receive a gesture input on the screen of the touch-screen apparatus by the user for the floating control, and to adjust the position and shape of the floating control according to the received gesture until the floating control encircles the content to be searched for in the user interface.

The capturing unit 203 is used to capture the image encircled by the floating control in the user interface.

The recognition unit 204 is used to recognize the content to be searched for encircled in the captured image.

The search unit 205 is used to call a defined search interface, which may be predefined, for searching according to the type of recognized content to be searched for.

In consideration that the rectangular shape may be easier for the user to operate than other closed shapes, the floating control according to an embodiment is a rectangular box to suit users' habit better.

In an embodiment where the floating control is a rectangular box, the adjustment unit 202 adjusts the position and shape of the floating control according to the received gesture until the floating control encircles the content to be searched for in the user interface, the processing may comprise: the type of the received gesture is determined; if the received gesture is touching and dragging of the rectangular box by the user with a finger, the position of the rectangular box is moved according to the trajectory of the sliding of the finger; if the received gesture is touching and relative sliding of two fingers of the user from the inside toward the outside of the rectangular box along a direction across two opposite sides of the rectangular box or along a diagonal direction, the rectangular box is enlarged along the direction across two opposite sides of the rectangular box or along the diagonal direction of the rectangular box; if the received gesture is touching and relative sliding of two fingers of the user from the outside toward the inside of the rectangular box along a direction across two opposite sides of the rectangular box or along a diagonal direction, the rectangular box is diminished along the direction across two opposite sides of the rectangular box or along the diagonal direction of the rectangular box; if the received gesture is releasing and leaving of the user's fingers from the rectangular box, the adjusting of the position and shape of the rectangular box is ended.

In the consideration of limited memory and resources of the touch-screen apparatus, to reduce consumption of the memory and resources of the touch-screen apparatus, the recognition unit 204 according to an embodiment may: send the captured image to a server for recognition; and receive the recognition result corresponding to the captured image from the server as the content to be searched for.

According to an embodiment, the types of the recognized content to be searched for include Chinese and English As users' search objects is some applications may be mainly some unfamiliar Chinese phrases and English words, the content to be searched for may be categorized into two cases, e.g. Chinese and English, for the convenience of processing, and therefore, according to an embodiment, the types of the content to be searched for include Chinese and English.

For example, in an embodiment where the types of the recognized content to be searched for include Chinese and English, the processing of the search unit 205 may comprise: determining the type of the recognized content to be searched for according to the recognized content to be searched for; if the type of the recognized content to be searched for is Chinese, calling an encyclopedia search interface to perform search on the content to be searched for; if the type of the recognized content to be searched for is not Chinese, calling a translation search interface to translate the content to be searched for.

In an embodiment, the user can also select an appropriate search interface according to the type of the recognized content to be searched for, so as to perform searches on the content to be searched for. For example, according to an embodiment, the processing of the search unit 205 may comprise: providing a plurality of processing options on the screen of the touch-screen apparatus, the various processing options corresponding to defined search interfaces; receiving the processing option selected by the user according to the type of the recognized content to be searched for and calling a defined search interface according to the processing option selected by the user.

To show the relevant search result without affecting the user's view of the current content, the embodiment shown in FIG. 2 may comprise: an exhibiting unit (not shown in the figure) for calling a defined application interface for exhibiting based on the type of the available search result.

For example, in an embodiment the types of the search result include text, picture, map, video, and music.

The processing for the exhibiting unit may comprise: determining the type of the search result based on the search result; if the type of the search result is video or music, calling a defined player program to play the search result; otherwise, creating a floating window in the screen of the touch-screen apparatus, to exhibit the search result in the floating window.

An embodiment is able to search relevant information in the current page without switching the current page in operation, and also able to provide a variety of types of searching according to the user's needs. An embodiment may perform searches directly on information of the current page, which facilitates avoiding the tedious routine search process, which may improve the efficiency of searches to a large extent and enhance the user experience.

As should be noted, according to the needs for implementation, the individual steps described herein can be split into more steps, two or more steps or part of the operation of a step can be combined into a new step, steps may be omitted, etc., in various embodiments. One or more embodiments may be combined to obtain additional embodiments.

The aforementioned methods and devices may be implemented in a hardware or a firmware, or implemented as a software or computer coded stored in a recording medium (such as a CD ROM, RAM, floppy disk, hard disk, or magneto-optical disk), or implemented as computer codes that can be downloaded and are originally stored in a remote recording medium or a non-volatile machine-readable medium and will be stored in a local recording medium, etc., and various combinations thereof; accordingly, the methods described herein may be handled by a software stored in a medium using a general computer, a special processor or programmable or dedicated hardware (such as ASIC or FPGA). As can be understood, a computer, a processor, a microprocessor controller or programmable hardware includes a storage assembly (e.g., RAM, ROM, flash memory, etc.) that can store or receive a software or computer codes, when the computer software or computer codes are accessed and executed by the processor or hardware, the processing method described herein is carried out. In addition, when a general computer accesses codes that implements the processes shown herein, the execution of the codes will convert the general computer to a special computer for executing the processes shown herein.

Although the present disclosure is represented and described with references to example embodiments, one of ordinary skill in the art understands that the embodiments can be revised and changed without departing for the spirit and scope of the present disclosure.

I claim:

1. A method for searching in a touch-screen apparatus, comprising:

displaying a floating control having an adjustable position and shape for encircling content to be searched for on a user interface of the touch-screen apparatus, wherein an inner region of the floating control has a transparent background and the content to be searched for is a part of a page displayed on a screen of the touch-screen apparatus;

receiving a gesture input on the screen by a user for the floating control, and adjusting a position and shape of the floating control currently displayed on the screen according to the received gesture until the floating control encircles the content to be searched for in the user interface;

capturing an image encircled by the floating control in the user interface;

recognizing the content to be searched for encircled in the captured image; and calling a defined search interface for searching according to a type of recognized content to be searched for, wherein, the floating control is a rectangular box; and the adjusting the position and shape of the floating control according to the received gesture until the floating control encircles the content to be searched for in the user interface comprises:

determining a type of the received gesture;

if the received gesture is touching and dragging of the rectangular box by the user with a finger, moving the position of the rectangular box according to a trajectory of the dragging of the finger;

if the received gesture is touching and relative sliding of two fingers of the user from an inside toward an outside of the rectangular box along a direction across two opposite sides of the rectangular box or along a diagonal direction of the rectangular box, enlarging the shape of the rectangular box along the direction across two opposite sides of the rectangular box or along the diagonal direction of the rectangular box;

if the received gesture is touching and relative sliding of two fingers of the user from the outside toward the inside of the rectangular box along a direction across two opposite sides of the rectangular box or along a diagonal direction of the rectangular box, diminishing the shape of the rectangular box along the direction across two opposite sides of the rectangular box or along the diagonal direction of the rectangular box; and if the received gesture is releasing and leaving of the user's fingers from the rectangular box, ending the adjusting of the position and shape of the rectangular box.

2. The method according to claim 1, wherein recognizing the content to be searched for encircled in the captured image comprises:

sending the captured image to a server for recognition; and receiving the recognition result corresponding to the captured image from the server as the content to be searched for.

3. The method according to claim 2, wherein the types of the recognized content to be searched for include Chinese and English.

4. The method according to claim 3, wherein calling a defined search interface according to the type of recognized content to be searched for comprises:

determining the type of the recognized content to be searched for according to the recognized content to be searched for;

if the type of the recognized content to be searched for is Chinese, calling an encyclopedia search interface to search for the content to be searched for; and if the type of the recognized content to be searched for is not Chinese, calling a translation search interface to translate the content to be searched for.

5. The method according to claim 4, wherein calling a defined search interface according to the type of recognized content to be searched for comprises:
providing a plurality of processing options on the screen of the touch-screen apparatus, the various processing options corresponding to defined search interfaces; and
receiving the processing option selected by the user according to the type of the recognized content to be searched for and calling a defined search interface according to the processing option selected by the user.

6. The method according to claim 5, comprising:
calling a defined application interface for exhibiting based on the type of the available search result.

7. The method according to claim 6, wherein the types of the search result include text, picture, map, video, and music.

8. The method according to claim 7, wherein calling a defined application interface for exhibiting based on the type of the available search result comprises:
determining the type of the search result based on the search result;
if the type of the search result is video or music, calling a defined player program to play the search result; and
otherwise, creating a floating window in the screen of the touch-screen apparatus, and exhibiting the search result in the floating window.

9. A device comprising at least one processor, memory, and at least one computer program, the at least one computer program being stored in the memory and executed by at least one processor, wherein the computer program comprises instructions to execute the following operations:
displaying a floating control having an adjustable position and shape for encircling content to be searched for on a user interface of a touch-screen apparatus, wherein an inner region of the floating control has a transparent background and the content to be searched for is a part of a page displayed on a screen of the touch-screen apparatus;
receiving a gesture input on the screen by a user for the floating control, and adjusting a position and shape of the floating control currently displayed on the screen according to the received gesture until the floating control encircles the content to be searched for in the user interface;
capturing an image encircled by the floating control in the user interface;
recognizing the content to be searched for encircled in the captured image; and
calling a defined search interface for searching according to the type of recognized content to be searched for, wherein,
the floating control is a rectangular box; and
the adjusting the position and shape of the floating control according to the received gesture until the floating control encircles the content to be searched for in the user interface comprises:
determining a type of the received gesture;
if the received gesture is touching and dragging of the rectangular box by the user with a finger, moving the position of the rectangular box according to a trajectory of the dragging of the finger;
if the received gesture is touching and relative sliding of two fingers of the user from an inside toward an outside of the rectangular box along a direction across two opposite sides of the rectangular box or along a diagonal direction of the rectangular box, enlarging the shape of the rectangular box along the direction across two opposite sides of the rectangular box or along the diagonal direction of the rectangular box;
if the received gesture is touching and relative sliding of two fingers of the user from the outside toward the inside of the rectangular box along a direction across two opposite sides of the rectangular box or along a diagonal direction of the rectangular box, diminishing the shape of the rectangular box along the direction across two opposite sides of the rectangular box or along the diagonal direction of the rectangular box; and
if the received gesture is releasing and leaving of the user's fingers from the rectangular box, ending the adjusting of the position and shape of the rectangular box.

10. The device according to claim 9, wherein the recognizing the content to be searched for encircled in the captured image comprises:
sending the captured image to a server for recognition;
receiving the recognition result corresponding to the captured image from the server as the content to be searched for.

11. The device according to claim 10, wherein the types of the recognized content to be searched for include Chinese and English.

12. The device according to claim 11, wherein the calling a defined search interface according to the type of recognized content to be searched for comprises:
determining the type of the recognized content to be searched for according to the recognized content to be searched for;
if the type of the recognized content to be searched for is Chinese, calling an encyclopedia search interface to search for the content to be searched for; and
if the type of the recognized content to be searched for is not Chinese, calling a translation search interface to translate the content to be searched for.

13. The device according to claim 12, wherein the calling a defined search interface according to the type of recognized content to be searched for comprises:
providing a plurality of processing options on the screen of the touch-screen apparatus, the various processing options corresponding to defined search interfaces;
receiving the processing option selected by the user according to the type of the recognized content to be searched for; and
calling a defined search interface according to the processing option selected by the user.

14. The device according to claim 13, wherein the computer program comprises instructions to execute the following operation:
calling a defined application interface for exhibiting based on a type of the available search result.

15. The device according to claim 14, wherein the types of the search result include text, picture, map, video, and music.

16. The device according to claim 15, wherein the calling a defined application interface for exhibiting based on the type of the available search result comprises:
determining the type of the search result based on the search result;
if the type of the search result is video or music, calling a defined player program to play the search result; and otherwise, creating a floating window in the screen of the touch-screen apparatus, to exhibit the search result in the floating window.

17. A computer storage medium coded with computer programs, wherein when executed by one or more computers, the computer programs cause the one or more computers to execute the following operations:

displaying a floating control having an adjustable position and shape for encircling content to be searched for on a user interface of a touch-screen apparatus, wherein an inner region of the floating control has a transparent background and the content to be searched for is a part of a page displayed on a screen of the touch-screen apparatus;

receiving a gesture input on the screen by a user for the floating control, and adjusting a position and shape of the floating control currently displayed on the screen according to the received gesture until the floating control encircles the content to be searched for in the user interface;

capturing an image encircled by the floating control in the user interface;

recognizing the content to be searched for encircled in the captured image; and calling a defined search interface for searching according to the type of recognized content to be searched for, wherein, the floating control is a rectangular box; and the adjusting the position and shape of the floating control according to the received gesture until the floating control encircles the content to be searched for in the user interface comprises:

determining a type of the received gesture;

if the received gesture is touching and dragging of the rectangular box by the user with a finger, moving the position of the rectangular box according to a trajectory of the dragging of the finger;

if the received gesture is touching and relative sliding of two fingers of the user from an inside toward an outside of the rectangular box along a direction across two opposite sides of the rectangular box or along a diagonal direction of the rectangular box, enlarging the shape of the rectangular box along the direction across two opposite sides of the rectangular box or along the diagonal direction of the rectangular box;

if the received gesture is touching and relative sliding of two fingers of the user from the outside toward the inside of the rectangular box along a direction across two opposite sides of the rectangular box or along a diagonal direction of the rectangular box, diminishing the shape of the rectangular box along the direction across two opposite sides of the rectangular box or along the diagonal direction of the rectangular box; and if the received gesture is releasing and leaving of the user's fingers from the rectangular box, ending the adjusting of the position and shape of the rectangular box.

* * * * *